United States Patent [19]
Hayre

[11] 3,791,200
[45] Feb. 12, 1974

[54] FLUID POLLUTION MONITORING APPARATUS AND METHOD

[76] Inventor: Harbhajan S. Hayre, 10 Legend Ln., Houston, Tex. 77024

[22] Filed: Sept. 9, 1971

[21] Appl. No.: 179,090

Related U.S. Application Data

[63] Continuation-in-part of Ser. No. 43,123, June 3, 1970, abandoned.

[52] U.S. Cl..................... 73/67.1, 73/61 R, 73/67.7
[51] Int. Cl. ........................................... G01n 29/02
[58] Field of Search ............. 73/67.1, 61, 61.1, 67.7

[56] References Cited
UNITED STATES PATENTS 3,359,787  12/1967  Zemanek ........................ 73/61.1 R
2,966,056  12/1960  Heller ................................ 73/61 X
3,359,788  12/1967  Colvin.............................. 73/67.1 X
3,427,866  2/1969  Weighart ............................ 73/67.7

Primary Examiner—Richard C. Queisser
Assistant Examiner—Arthur E. Korkosz
Attorney, Agent, or Firm—Pravel, Wilson & Matthews

[57] ABSTRACT

A new and improved method and apparatus for monitoring fluids to determine the presence of pollutants in the fluid and further to identify the type and quantity of pollutants in the fluid by analysis of the acoustic impedance properties of the fluid.

7 Claims, 6 Drawing Figures

MONOSTATIC (M) / BISTATIC (B) SIGNAL LEVEL MODE - (C.W./PULSE)

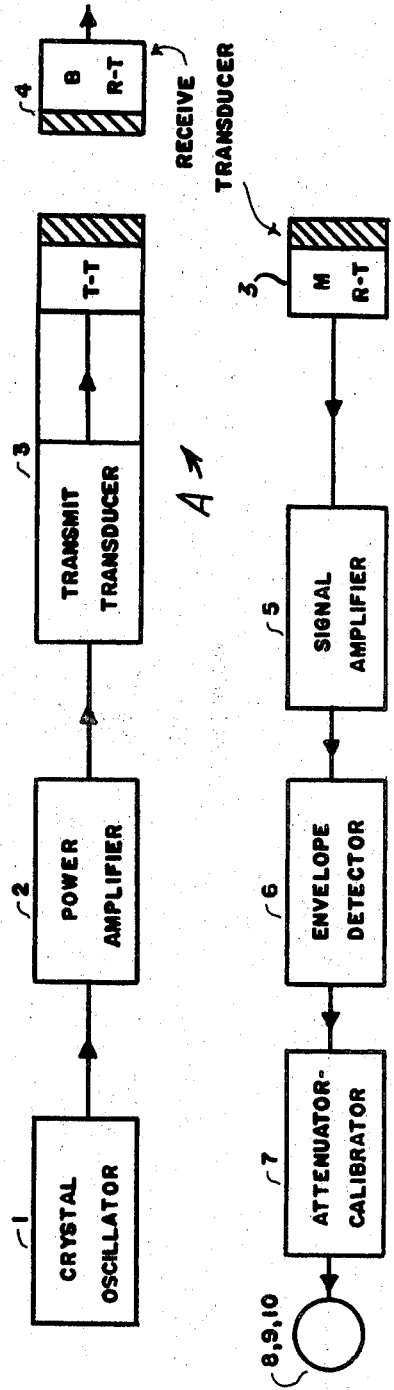
FIG.1 MONOSTATIC (M) / BISTATIC (B) SIGNAL LEVEL MODE - (C.W./PULSE)
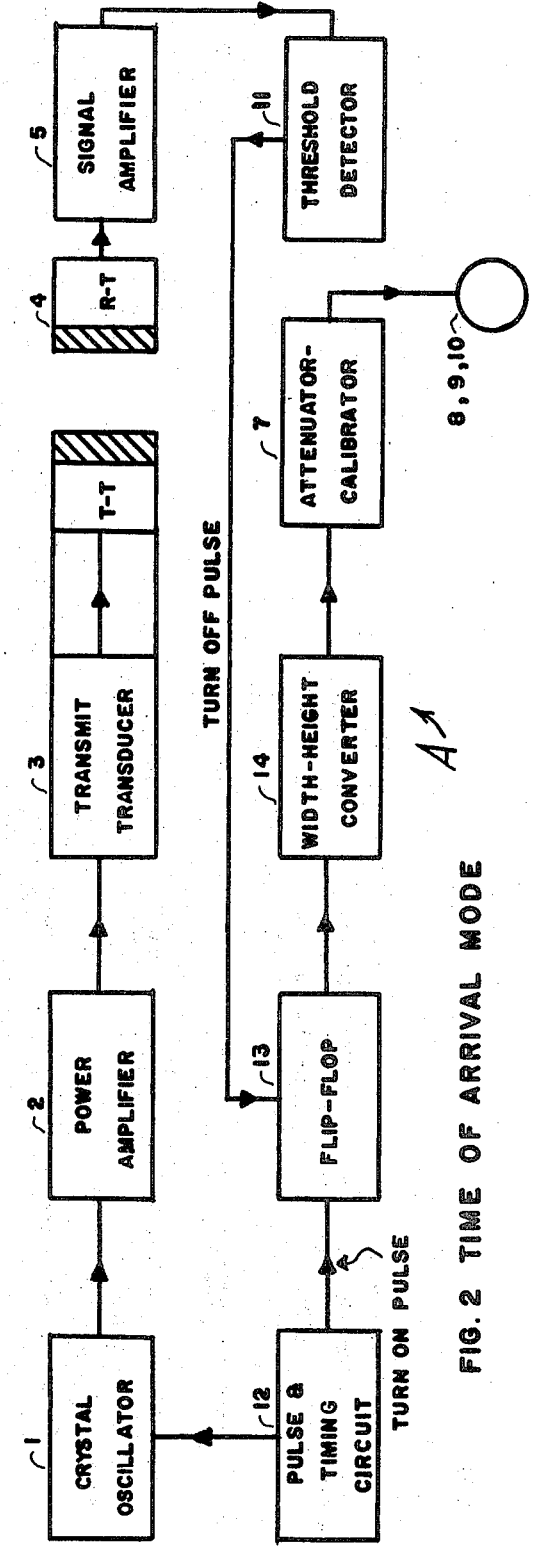
FIG. 2 TIME OF ARRIVAL MODE

FLUID POLLUTION MONITORING APPARATUS AND METHOD

CROSS-REFERENCE TO RELATED APPLCATION

The present application is a continuation-in-part of my prior co-pending U.S. Patent application, "Fluid Pollution Monitoring System", Ser. No. 43,123, filed June 3, 1970, co-pending herewith, and now abandoned.

BACKGROUND OF THE INVENTION

1. Field of the Invention

The present invention relates to apparatus and methods for monitoring fluids to determine the type and quantity of pollutants therein.

2. Description of Prior Art

So far as is known, the prior art apparatus related to determining the presence of undesirable materials in a medium under test by measuring the amount of energy reflected of an acoustical test signal by the undesirable materials, if such were solids; by masuring the travel time of the test signal through the medium under test; or by measuring the attenuation of the test signal by the medium.

The prior art apparatus attempted to identify the amount of undesirable pollutant in the medium after the type of pollutant had been identified, requiring rior analysis of the medium by chemical or other techniques to identify the pollutant, complicating the monitoring process.

SUMMARY OF THE INVENTION

Briefly, the present invention provides a new and improved method and apparatus for determining the presence of pollutants in a medium under examination by sending an incident, or incidence pressure wave into a medium of unknown acoustical impedance, sensing a return signal reflected from the medium and monitoring the return signal to determine acoustical impedance of the medium on the basis of the reflected signal wherein the presence of the pollutant may be determined on the basis of the acoustical impedance properties so sensed and determined.

BRIEF DESCRIPTION OF THE DRAWINGS

FIGS. 1 and 2 are functional block diagrams of the apparatus of the present invention.

DESCRIPTION OF THE PREFERRED EMBODIMENT

Figure 4:
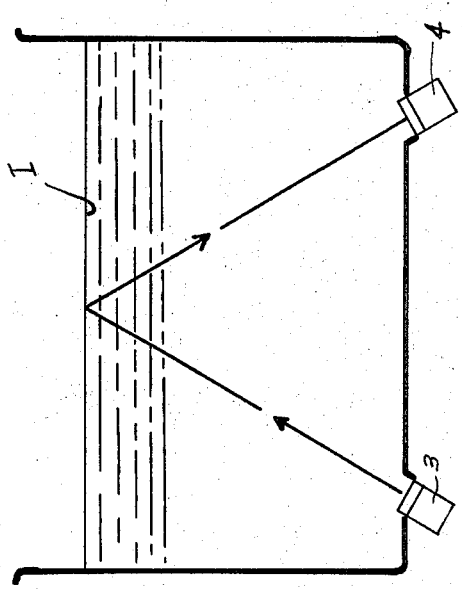
FIGS. 3–6 are schematic diagrams of alternative operating modes illustrating the operation of the apparatus of the present invention.

In the drawings, the letter A designates generally the apparatus of the present invention which monitors a medium, which may be fluid, either liquid or gas, or solid for the presence of gaseous, liquid, or solid pollutants therein. As will be set forth hereinbelow, the apparatus A determines the presence of such pollutants, as well as determine the type and amount of pollutant present in the medium. The pollutants monitored by the apparatus A may be dissolved or suspended into a fluid, or may be separated from the fluid into a separate layer, forming a plane interface or boundary between the pollutant and the fluid, with the pollutant floating at the upper or lower surface of the fluid, depending upon the relative densities of the pollutant and the fluid. With a solid medium, the pollutants are mixed and suspended therein.

The apparatus A determines the presence of pollutants in the medium of known acoustical impedance properties under examination by sending an incidence pressure wave signal into the medium, sensing a signal returned from the medium and monitoring the returned signal to determine the acoustical impedance of the medium on the basis of the returned signal in order that the presence of the pollutant may be determined on the basis of the acoustical impedance properties of the medium, as will be set forth hereinbelow.

The apparatus A may be used as an offshore oil slick or pollution detector and monitor and may be locally or remotely monitored in order to obtain and update pollution reports on a body of water. For deep sea shipping lanes and other navigable bodies of water, the apparatus A is deployed at depths of from a few hundred feet to a few thousand feet. The apparatus A utilizes incidence pressure waves of sonic or ultrasonic energy of frequencies of from 10 kilohertz to 100 kilohertz.

In the case of offshore oil platforms, harbors, lakes, and non-navigable water bodies, the apparatus A may be deployed near the surface of the body of water. The apparatus A utilizes ultrasonic pressure incidence waves of frequencies of the order of 10 khz to 1 megahertz or higher. The apparatus A further has numerous other uses in industry in order to determine the mixture of fluids and monitor such mixtures for pollutant contents and the like. The apparatus A may further be utilized in order to determine the relative mixture of two solids by determining the acoustical impedance properties of the mixed solids.

The apparatus A may further be used in laboratory analysis of samples or specimens or in industrial plants or facilities to monitor fluids in pipes, pipelines, or conduits for the presence of pollutants therein.

The apparatus A has two operating modes which are used separately or in conjunction with each other, in accordance with the desired pollution monitoring operation being performed, a signal level mode (FIG. 1), and a time of arrival mode (FIG. 2).

In the signal level mode of operation of the apparatus A (FIG. 1), a sinusoidal (or a pulsed-continuous wave) signal of appropriate frequency, for example, from 10 khz to 1 mhz, as has been previously set forth, is generated by a standard crystal oscillator or pulsed-crystal oscillator 1. The output voltage of the oscillator 1 is amplified in a power amplifier 2 and furnished to a transmitting transducer 3 which generates a longitudinal pressure incidence wave in the fluid in which it is immersed. The pressure incidence wave travels through the medium under examination and is received by a receiving transducer 4 whose output is amplified in a signal amplifier 5 (or range-gated for pulsed pressure incidence waves).

The output of the signal amplifier 5 is fed to an envelope detector 6 having a variable time constant, depending on the randomess of the medium under examination, in order to compensate for flow, wave movement, or other factors of the medium. The averaged signal level output of the envelope detector 6 is attenuated by an attenuator/calibrator 7 which is pre-set during calibration for the particular type of medium and monitoring operation as well as the particular pollutant being monitored.

The output of the attenuator/calibrator 7 may be displayed and/or monitored on a voltmeter 8, a paper or magnetic tape recording apparatus 9 or other suitable data storage apparatus, or transmitted over a transmission line 10 to a remote terminal for monitoring and display.

The apparatus A has alternative operating modes in the signal level mode, a monostatic signal level mode and a bistatic signal level mode, in accordance with the number of placement of transducers used in the apparatus A.

Figure 3:
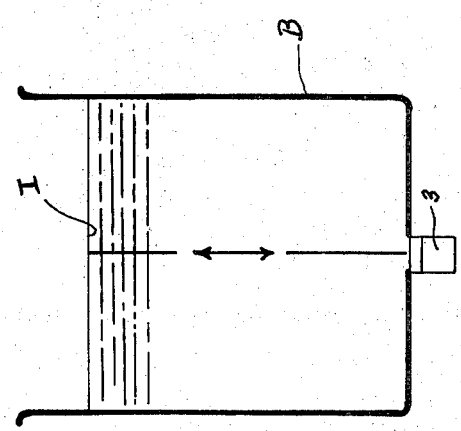
Figure 5:
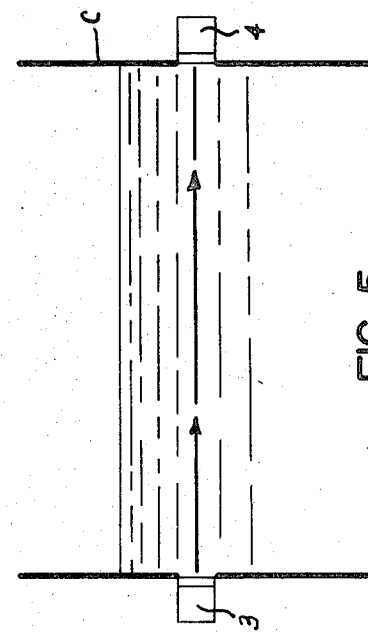

In th monostatic signal level mode (FIGS. 1 and 3), a single transducer 3 serves as the transmit and as the receive transducer, sending the pressure indicence wave into the medium and sensing a signal returned from same. In the embodiment of FIG. 3 the medium is contained in a specimen or sample containing beaker B.

Figure 6:
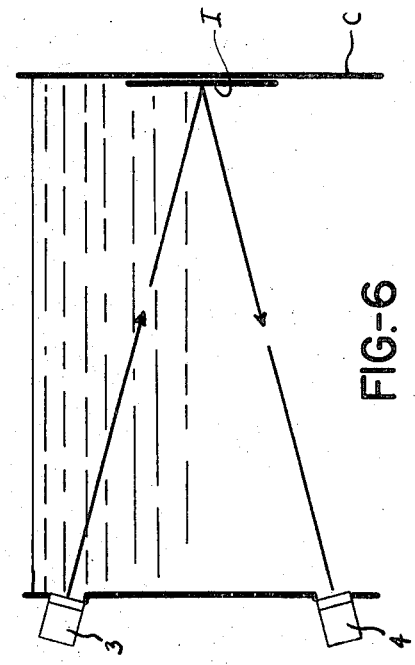

In the bistatic signal level mode, (FIGS. 1 and 4-6), a transmit transducer 3 sends the incidence pressure wave signal into the medium being monitored and a receive transducer 4 senses the signal returned from the medium and furnishes the signal to the signal amplifier 5. In the embodiment of FIG. 4, the medium is contained in a specimen or sample containing beaker B. In FIG. 6, the medium is flowing through a fluid pipe or conduit C. It should be understood that the previous embodiments are illustrative and not limitative of the present invention, For example, the monostatic signal level mode may be used in the embodiment of FIG. 6, if desired, with the sending/receiving transducer sending a signal into the medium normal to the reflective interface.

In the time of arrival mode of operation of the apparatus A, (FIGS. 2 and 5), the medium is flowing through a fluid pipe or conduit C. In the time of arrival mode, the crystal oscillator 1 is pulse modulated by a pulse trigger unit 12, and the output of the oscillator 1 is power amplified in a power amplifier 2 and furnished to the transmitting trasnducer 3. The transmitting transducer 3 sends an incidence pressure wave signal into the medium being monitored. The incidence pressure wave is received by the receiving transducer 4 and the signal output of the transducer 4 is amplified in a signal amplifier 5. The amplified output signal from the amplifier 5 is fed to a threshold detector 11 which responds to the arrival of a pulse from the amplifier 5 by triggering an output impulse signal, designated TURN OFF PULSE in the drawings.

The pulse generator 12 furnishes a signal to a flip-flop 13 at the time that the crystal oscillator 1 is pulse modulated. The flip-flop 13 responds to the signal from the pulse generator 12 and assumes an on or logical 1 position and maintains same until receipt of the TURN OFF PULSE from the threshold detector 11 at which time the flip-flop 13 returns to an off or logical 0 state. Thus, the flip-flop 13 generates a square wave whose time duration corresponds to the time required for the pressure incidence wave to travel from the transmit transducer 3 to the receive transducer 4 through the medium being monitored ahead.

The distance between the two transducers 3 and 4 is fixed and determined by the mounting of such transducers with the conduit C (FIG. 5), and thus the distance between the transducers 3 and 4 is known. The distance between the transducers 3 and 4 represents the distance for travel of the incidence pressure wave through the medium being monitored. Determination of the travel time for the pressure incidence wave through the medium by the apparatus A, in a manner to be set forth hereinbelow, enables the propagation velocity of the pressure incidence wave through the medium being monitored to be determined.

The square wave output of the flip-flop 13 is provided to a pulse width-to-height converter 14 of the conventional type which forms an output signal whose amplitude indicates the relative width of the square-wave input pulse. The amplitude of the signal so formed in the converter 14 accordingly represents the travel time of the pressure incidence wave through the medium being monitored. An amplitude inverter of the conventional type is further included in the converter 14 in order to provide an output signal whose amplitude is inversely proportional to the signal amplitude from the width-to-height converter, thereby corresponding to the travel time of the incidence wave through the medium. The output signal from the inverter in the converter 14 accordingly represents the inverse of the travel time, namely the propagation velocity of the pressure incidence wave through the medium under examination. Determination of the propagation velocity of the pressure incidence wave in the medium provides an indication, as will be set forth hereinbelow, of the type of pollutant present in the medium.

The output amplitude signal from the converter 14 indicating the propagation velocity of the pressure incidence wave in the medium being monitored is provided through an attenuator/calibrator 7 which is adjusted and calibrated, as has been previously set forth, to determine the particular type of pollutant being monitored. The output of the attenuator/calibrator 7 is displayed on a voltmeter 8 and/or recorded in a suitable data storage device 9 or transmitted over a remote transmission line 10 to a suitable data monitoring and display system, as has been previously set forth.

Alternatively, for a known medium of unknown thickness, the travel time of a pressure incidence wave through the medium may be determined by the apparatus A, and when multiplied by the propagation velocity of the medium yield the thickness of the medium, which can be used to determine the volume or quantity of the medium.

The following chart sets forth the title and cataloque number of suitable commercially available units which may be used in the apparatus A, although other commercially available units of like structure and function may be used with the apparatus A, if desired:

COMMERCIALLY AVAILABLE UNITS
EQUIVALENT TO BLOCKS LISTED IN FIGS. 1
AND 2

| Block No. | Commercial Equivalent | |
|---|---|---|
| 1 | Crystals or General Radio Oscillator | Cat No. 1310A |
| 2 | Hewlett-Packard Power Amplifier | Cat No. 467A |
| 3 | Branson Instrument — ZT Transducer | |
| 4 | Branson Instrument — ZI Transducer | |
| 5 | Hewlett-Packard General Purpose Fast Pulse Amplifiers | Cat No. 461-4-62 |
| 6 | Hewlett-Packard AC-Voltmeter | Cat No. 400 EL |
| 7 | Hewlett-Packard Attenuator | Cat No. 2750A |
| 8 | DC Voltmeter | Conven- |

| 9 | Tape Recorder | Conventional |
| 10 | Remote Transmission Line | Conventional |
| 11 | Threshold Detector General Radio | Cat No. 1212A |
| 12 | Data Pulse Generator | Cat No. 101 |
| 13 | Flip-Flop Motorola | Cat No. MC10-13 |
| 14 | Width-Height Converter Inverter | SOECCO Model 200 |

Referring now to the various operating modes of the apparatus A (FIGS. 3–6), in the operation of the present invention, the transducer 3 sends a pressure incidence wave into the medium being monitored.

In the monostatic signal level mode (FIG. 3), the transducer 3 serves as the sending transducer and as the receiving transducer and sends the pressure incidence wave into the medium. If the pollutant being monitored in the medium is mixed, emulsified, or soluble in the medium, the pressure incidence wave will travel through the medium and be reflected at a plane interface I formed at the upper surface of the medium between the medium and surrouding air. The pressure incidence wave returns from the interface I to be sensed by the transducer 3, serving at this time as the receiving transducer.

when monitoring for a known type of mixed or soluble pollutant in the medium under examination, the magnitude or amplitude of the pressure incidence wave sensed by the receiving transducer after being sent into the medium and reflected from the interface I is measured. The amplitude so measured is then compared against a reference chart or table, formulated in a manner to be set forth hereinbelow, and the amount of the soluble pollutant can be determined with reference thereto. An example chart is set forth in Appendix I.

The reference chart or table for monitoring for unknown concentrations of known pollutants is formed by pre-calibration testing, sending pressure incidence waves into known concentrations of the soluble pollutant in the medium and recording the test results in a reference chart or standard. The chart is then used as a reference for determining the concentration of the known type of pollutant in the medium being tested, comparing the amplitude of the test signal measurement indicating the unknown concentration with the pre-calibration test data recorded on the reference chart. Typical amplitude measurements obtained for Diesel No. 2 oil emulsified in water are in the range 2 millivolts for each part per million of Diesel No. 2. In this manner, the concentration of a known type of mixed or soluble pollutant in a medium being monitored can be determined by the apparatus A of the present invention. For ease in calibration and calculation, each of the monitoring operations is preferably performed at standard conditions of temperature, pressure, and the like.

When monitoring with the apparatus A for an insoluble pollutant of unknown type or quantity in the medium being monitored, such pollutants will form a layer above or below the medium in accordance with the relative densities of the medium and the pollutants. For example, if the pollutant is oil and the medium is water, the oil will float and form a layer or film at the top of the water. If the pollutant is mercury and the medium is water, the mercury will settle below the water and form a layer beneath the water medium.

The adjacent layers of the pollutant and the mediums form an additional plane interface in a like manner to the interface I between the medium and air illustrated in the accompanying drawings. When the pollutant in the layer is of known type and unknown quantity, the thickness of the pollutant may be measured by the apparatus A, operating in the signal level mode as will be set forth hereinbelow, or the time of arrival mode as set forth hereinabove, and the surface area of the pollutant determined by known area measurement techniques. The volume of the pollutant then can be readily determined based on the surface area of the medium covered by the pollutant and the thickness thereof determined by the apparatus A.

If the pollutant being monitored is of unknown type, the apparatus A operates in the signal level mode and determines the type of pollutant on the basis of the acoustical impedance properties of the medium and the pollutant.

A pressure incidence wave is sent into the medium from the sending transducer 3 and is reflected at each of the plane interfaces formed in the medium and is returned to the receiving transducer 3 (when operating in the monostatic signal level mode) or the receiving transducer 4 (when operating in the bistatic signal level mode). The amplitude of the reflected signal is then divided by the amplitude of the transmitted signal and the ratio R therebetween determined.

As has been set forth in the text book "Ultrasonics", B. Carlin, Second Edition, 1960, McGraw-Hill Book Co., New York, N.Y., an unknown substance having a specific density $p$, a propagation velocity $c$ for pressure incidence waves transmitted therethrough, and an unknown thickness $d$ forming a layer above or below a medium having known specific density $p_o$ and propagation velocity $c_o$, with air or other material forming an additional interface and having a density $p_a$ and propagation velocity $c_a$, the reflection coefficient or ratio $R$ is defined as follows:

$$R = (R_o + R_a e^{-j2\alpha d})/(1 + R_a R_o e^{-j2\alpha d}) \quad (1)$$

Squaring the equation (1) to remove the complex variables results in the following equation:

$$|R|^2 = [(R_o + R_a \cos 2\alpha d)^2 + R_a^2 \sin^2 2\alpha d]/[(1 + R_a R_o \cos 2\alpha d)^2 + R_a^2 R_o^2 \sin^2 2\alpha d] \quad (2)$$

where:

$\alpha = 2\pi f/c$, $f$ = known frequency of pressure incidence wave;

$Z = pc$ = acoustical impedance of unknown pollutant, $Z_o = p_o c_o$ = acoustical impedance of medium, $Z_a = p_a c_a$ = acoustical impedance of air or other material $R_o = (Z - Z_o)/(Z + Z_o)$;

$R_a = (Z - Z_a)/(Z + Z_a)$ $\lambda = c/f$

Examination of the above in view of Equation (2) indicates that three unknowns exist, namely the specific density $p$ and propagation velocity $c$ of the unknown pollutant, and the thickness $d$ of such pollutant.

Three simultaneous equations may then be developed by transmitting pressure incidence waves at three known frequencies $f$, and measuring the received pressure incidence wave signal amplitude at the receiving transducer in order to determine the reflection coefficeint or ratio $R$ for each frequency. The three simultaneous equations that may then be solved to determine the three unknown quantities $p$, $d$, and $c$, using simple algebra equation solving techniques. The specific density $p$ and the propagation velocity $c$ uniquely characterize the pollutant, and accordingly the pollutant can be identified.

Representative specific densities $p$, propagation velocities $c$, and acoustic impedances $z$ for typical pollutants for which the apparatus A is used in monitoring may be found in reference books such as "Fundamentals of Acoustics" by L. E. Kinsler and A. R. Frey, John Wiley & Sons Publishers, New York, N.Y., 2nd Edition, 1962. A sample of data from such reference is set forth here below:

|  | $c$ Propagation Velocity M/Sec | $p$ Density Kg/m³ | $z$ Characteristic Impedance Rayls × 10⁶ |
|---|---|---|---|
| Liquids |  |  |  |
| Mercury | 1450 | 13600 | 19.7 |
| Water, fresh | 1481 | 998 | 1.48 |
| Water, sea | 1500 | 1026 | 1.54 |
| Alcohol | 1150 | 790 | 0.91 |
| Castor Oil | 1540 | 950 | 1.45 |
| Turpentine | 1250 | 870 | 1.11 |
| Glycerine | 1980 | 1260 | 2.5 |
| Saturated Hydrocarbons (Packing) 20°C |  |  |  |
| Pentane $C_5H_{12}$ | 1008 | 621 | $626\times10^{-3}$ |
| Hexane $C_6H_{14}$ | 1083 | 654 | $708.3\times10^{-3}$ |
| Heptane $C_7H_{16}$ | 1162 | 684 | $794.8\times10^{-3}$ |
| Octane $C_8H_{18}$ | 1192 | 703 | $838\times10^{-3}$ |
| Solids |  |  |  |
| Cork | 500 | 240 | 0.12 (Bulk) |
| Oak | 4000 | 720 | 2.9 (Bulk) |
| Pine | 3500 | 450 | 1.57 (Bulk) |
| Lucite | 1800/2650 | 1200 | 2.15/3.2 (Bar/Bulk) |
| Gases |  |  |  |
| Air 0° C | 331.6 | 1.293 | $428\times10^{-6}$ |
| Air 20° C | 343 | 1.21 | $415\times10^{-6}$ |
| $O_2$ | 317.2 | 1.43 | $453\times10^{-6}$ |
| $CO_2$ (low frequency) | 258 | 1.98 | $512\times10^{-6}$ |
| $H_2$ | 1269.5 | 0.09 | $114\times10^{-6}$ |
| Steam | 404.8 | 0.6 | $242\times10^{-6}$ |

When monitoring in the above manner for pollutants in a medium in a closed pipe or conduit C (FIG. 6), a sheet of material of known acoustic impedance properties is mounted within the conduit C, defining the plane interface I and functioning to reflect the pressure incidence wave from the sending transducer 3 to the receiving transducer 4.

For very thin layers of pollutant fluid, such as for example, oil on sea water or the like, with a pollutant layer thickness $d$ substantially smaller than the wave lengths of the pressure incidence signal wave, the reflection coefficient $R$ is defined in accordance with the following formula:

$$|R|^2 = \frac{\left(\frac{z_0}{z} - \frac{z}{z_0}\right)^2}{4\cot^2\left(\frac{2\pi d}{\lambda}\right) + \left(\frac{z_0}{z} + \frac{z}{z_0}\right)^2} \quad (3)$$

Such equation is set forth in the "Ultrasonics" reference previously referred to hereinabove.

As was the case with thicker layers of insoluble pollutants, three unknown terms are set forth in Equation (3). Three pressure incidence waves of three different known frequencies $f$ are sent into the medium being monitored and the reflected signal measured by the apparatus A in order to determine the reflection coefficient or ratio $R$ for each of the three test pressure incidence wave signals, defining three simultaneous equations which can be solved, as has been previously set forth, to determine the specific density $p$, the propagation velocity $c$, and the thickness $d$ of the insoluble pollutant. Identification of the pollutant from the acoustic impedance characteristics may then be performed, and the quantity of such pollutant determined by measurement of the surface area of the layer of pollutant and multiplication of the surface area by the thickness $d$ determined by solution of the three equations as has been previously set forth.

If the pollutant in the medium is of unknown type and quantity, the type is initially determined on the basis of the acoustic impedance properties in the manner previously set forth, and the quantity determined by either of the techniques previously set forth.

In this manner, the type and quantity of pollutant based upon the acoustic impedance properties thereof is determined by the apparatus A after forming a plane interface with the medium.

For a very thin layer of pollutant as compared to the pressure wave wavelength such as oil film on water, the relative received signal from the polluted medium with reference to a reference signal sent into unpolluted water indicates the type of pollutant as indicated in Appendix II.

It should be understood that the apparatus of the present invention may be used to monitor for plural types of pollutant in a fluid medium. If the pollutants are insoluble, the technique of equations (2) and (4) may be used based upon a plurality of layers, and determination of the acoustic impedance and thickness of the various layers may be made in accordance with such techniques. Similarly, the calibration charts may be calculated and formed for various combinations and concentrations of soluble pollutants in the medium being monitored.

The foregoing disclosure and description of the invention are illustrative and explanatory thereof, and various changes in the size, shape, and materials as well as in the details of the illustrated construction may be made without departing from the spirit of the invention.

APPENDIX I

Water and a commercially available machine cooling industrial fluid were mixed and tested and the following calibration chart formed:

| Percent Fluid in $H_2O$ by volume | 2.5 | 5.0 | 7.5 | 10.0 |
|---|---|---|---|---|
| Relative Sensor Response | 0.25 | 0.50 | 0.75 | 1.0 |

APPENDIX II

| Type of Oil in Oil Film | Relative Received Signal with Reference to Reference Signals |
|---|---|
| 1. Lube Oil | 175 |
| 2. Diesel No. 1 | 150 |
| 3. Vegetable Oil | 110 |
| 4. Mineral Oil | 080 |
| 5. No. oil film (Reference) | 300 |

I claim:

1. A method of determining the presence of pollutants in a medium under examination comprising the steps of:
   a. sending incidence pressure wave signals at three known frequencies into a medium of unknown acoustical impedance properties;

b. sensing the amplitude of the incidence pressure wave signals returned from the medium; at each of the three known frequencies;

c. monitoring the return signal at each of the three known frequencies to determine the ratio between the amplitude of the sent signal and the returned signal at each frequency; and d. determining and identifying the pollutant from the thickness, density and propagation velocity of the medium as calculated from the ratios resulting from said step of monitoring.

2. The method of claim 1, wherein the medium has a plane interface with a material of known acoustical impedance properties; and said step of sensing comprises the step of:

monostatically sensing the returned signals reflected from the plane interface.

3. The method of claim 1, wherein the medium has a plane interface with a material of known acoustical impedance properties and said step of sensing comprises the step of:

bistatically sensing the returned signals reflected from the plane interface.

4. The method of claim 1, wherein the incidence pressure waves are pulsed pressure waves and said step of sensing comprises the steps of:

a. receiving the pulsed pressure waves after passage thereof through the medium; and b. generating timing signals indicative of the time duration between said steps of sending and receiving, wherein the propagation velocity of the pressure wave in the medium may be monitored to determine the presence of pollutants in the medium.

5. The method of claim 4, wherein said step of sensing comprises the step of:

converting the timing signals into signals proportional in amplitude to the propagation velocity of the medium.

6. An apparatus for determining the presence of pollutants in a medium under examination, comprising:

a. means for sending a pulsed incidence pressure wave signal into a medium of unknown acoustical impedance;

b. means for sensing a signal returned from the medium, said means for sensing comprising:
1. flip-flop means for forming a timing signal in response to sending of the pulsed pressure wave;
2. means for receiving the pulsed pressure wave after passage thereof through the medium; and
3. threshold means for controlling said flip-flop means responsive to receipt of the pulsed pressure wave, wherein the propagation velocity of the pressure wave in the medium may be monitored to determine the presence of pollutants in the medium; and c. means for monitoring the sensed return signal to determine the acoustical impedance of the medium on the basis of the reflected signal wherein the presence of the pollutant may be determined on the basis of the acoustical impedance properties of such medium.

7. The structure of claim 6, further including:

means for converting the timing signal into a signal proportional in amplitude to the propagation velocity of the medium.

* * * * *